UNITED STATES PATENT OFFICE.

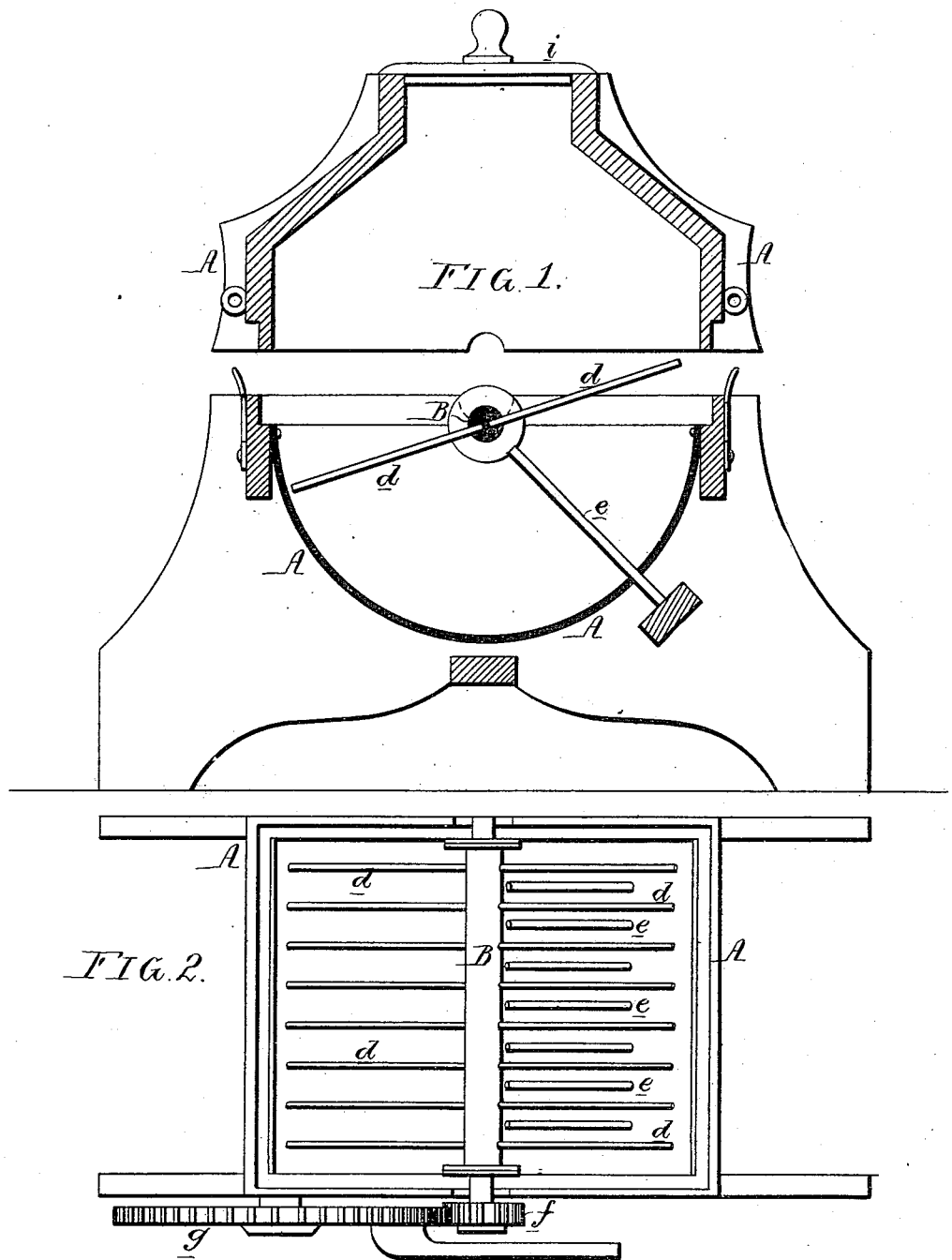

JOHN F. ROTE, OF READING, PENNSYLVANIA.

IMPROVEMENT IN EGG-BEATERS.

Specification forming part of Letters Patent No. 166,412, dated August 3, 1875; application filed August 25, 1873.

*To all whom it may concern:*

Be it known that I, JOHN F. ROTE, of Reading, Berks county, State of Pennsylvania, have invented an Improved Egg-Beater, of which the following is a specification:

The object of my invention is an apparatus for rapidly and thoroughly beating eggs, with an action similar to that of a fork when beating eggs by hand, the said apparatus consisting mainly of a casing, A, in which revolves a shaft, B, carrying two sets of prongs or arms, $d\ d$, which, in conjunction with a set of stationary arms, $e$, beat up eggs, eggs and sugar, &c., contained within the said casing, all as plainly shown in the vertical section, Figure 1, and plan view, Fig. 2, of the accompanying drawing.

The shaft B revolves in suitable bearings in the opposite sides of the casing, and has at one end a pinion, $f$, gearing into a large cog-wheel, $g$, provided with a suitable handle, $h$, by which means the said shaft and its arms $d$, of which there are two sets in the present instance, are driven at a very rapid rate of speed, the said arms passing between the fixed arms $e$, which are secured to the casing and frame of the apparatus, as shown in the drawing.

The eggs, eggs and sugar, or other materials to be treated are introduced through an opening in the top of the casing, covered by a lid, $i$, and are soon thoroughly beaten up and brought to the required light condition by the rotating arms $d$, acting in conjunction with the fixed arms $e$.

In the ordinary process of beating or "whipping" eggs by hand a fork is generally employed, and is so manipulated as to carry the prongs rapidly through without moving the liquid matter to any great extent, the object being to prevent any such movement, but at the same time to beat and "break up" the material.

With the above-described apparatus, precisely the same effect is produced as in beating eggs by hand, the prongs $d$ passing rapidly through and whipping or beating the eggs without materially moving the body of fluid, and the prongs $e\ e$ tending to retard any movement that might be initiated on the prongs $d$ first striking the surface.

The upper section of the casing is made entirely detachable from the lower section, as shown in Fig. 1, which enables the shaft and its beaters to be readily removed from the apparatus and access obtained to the interior of the latter, for the purpose of removing the beaten eggs for cleaning, &c. This is a matter of much importance, as in many beaters the eggs, after being beaten up, are confined in an inaccessible chamber, from which, owing to the light, frothy nature of the material, it is almost impossible to extract them.

In some cases one set of rotating arms $d$ may be found sufficient, and in other instances it may be found necessary to employ more than two sets; and there may also, if desired, be more than one set of stationary arms, $e$.

The apparatus, although well adapted to domestic use, is intended especially for cake-bakers.

I am aware that a rotating shaft with radial arms has been employed in egg-beaters, the arms being connected at the ends by a cross bar; and my invention consists of an improvement in such apparatus, in which the cross-bar, by unduly agitating and displacing the fluid, prevents it from being quickly and effectually beaten.

I claim—

The combination, in an egg-beater, of a casing, A, made in two sections, the upper of which is removable, the detachable shaft B, having prongs $d$, and the fixed bars $e$, all being constructed and arranged as set forth.

In testimony whereof I have signed my name to this specification in the presence of two subscribing witnesses.

JOHN F. ROTE.

Witnesses:
D. D. MAURER,
WILLIAM G. ROWE.